Oct. 26, 1937.  A. H. LAMB  2,096,902

DOOR OPERATING MECHANISM

Filed July 27, 1933

Inventor:
Anthony H. Lamb,
By Potter, Pierce & Scheffler,
Attorneys.

Patented Oct. 26, 1937

2,096,902

UNITED STATES PATENT OFFICE 2,096,902

DOOR OPERATING MECHANISM

Anthony H. Lamb, Elizabeth, N. J., assignor to Weston Electrical Instrument Corporation, Newark, N. J., a corporation of New Jersey Application July 27, 1933, Serial No. 682,534

11 Claims. (Cl. 250—41.5)

This invention relates to photoelectric cell circuits and particularly to a measuring system or relay circuit including a current responsive device and two photoelectric cells of the current generating type, the device being operable in accordance with the difference between the currents generated by the separate cells.

A simple circuit in which the cells are connected in series opposing relation with a current responsive device is open to the objections that the circuit resistance is very high when one cell is dark, and cells of the current generating type are unstable on open circuit or when included in a circuit in which there is no current flow.

An object of the invention is to provide a simple and sensitive system including two cells of the current generating type and a current responsive device. An object is to provide a relay system in which two photoelectric cells of the current generating type are connected in series aiding relation in a circuit, and a relay is connected across the series circuit to be subjected to the difference in the currents generated by the separate cells. A further object is to provide a relay system for automatically moving an object in response to a predetermined differential illumination of two photoelectric cells.

Figure 1:
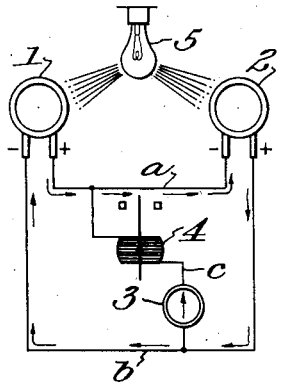
Figure 2:
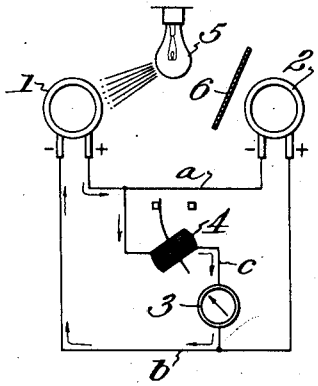
Figure 3:
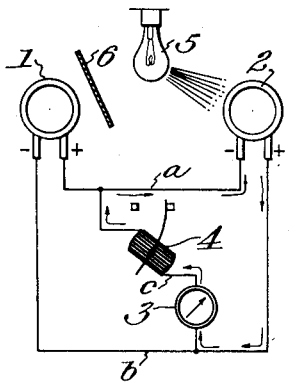
Figure 4:
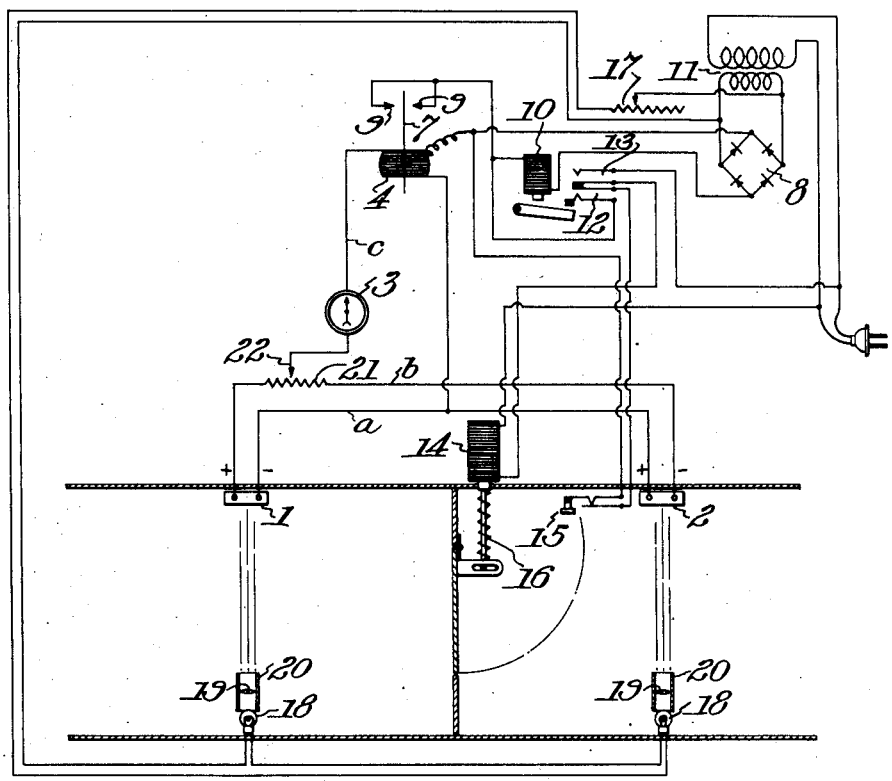

These and other objects and advantages of the invention will be apparent from the following specification when taken with the accompanying drawing, in which:

Figs. 1, 2 and 3 are schematic diagrams illustrating the circuit connections of two photoelectric cells and a current responsive device; and Fig. 4 is a circuit diagram of a relay system for controlling a door opening mechanism.

In the several views, the reference numerals 1 and 2 identify two photoelectric cells of the current generating type which are connected in a series aiding relation by leads $a$, $b$ which extend, respectively, between unlike terminals of the two cells. If a sensitive ammeter 3 and a relay 4 are connected across leads $a$, $b$, by a branch lead $c$, it will be apparent that no current will flow in the shunt lead $c$ when the cells are so illuminated, by a light source indicated by a lamp 5, as to generate equal currents.

The path of current flow will then be as indicated by the arrows in Fig. 1, and no current will flow through the ammeter and relay.

If the cell 2 is darkened, as by means of a shield 6, little or no current will be generated by that cell, and the effective circuit of the illuminated cell will include the branch lead $c$ and portions of leads $a$ and $b$. The resulting current flow in the shunt path will deflect the instrument pointer and the contact arm of the relay, as is indicated in Fig. 2. Similarly, if the cell 1 is darkened, the current flow will be substantially confined to the circuit indicated by the arrows showing current flow in Fig. 3, and the ammeter pointer and relay contact will be deflected in the opposite direction. It will be noted that the location of the current responsive device in a shunt path across the series aiding circuit subjects the device to the differential action of the two cells, but that the shunt path serves to complete a loop circuit for each cell which excludes the other cell. As compared with a simple series circuit in which the cells are arranged in opposing relation, the current output with the present circuit and when the cells were subjected to equal illumination was increased in a ratio of in excess of 3½ to 1.

The circuit arrangement may be used in various types of apparatus for measuring, or for controlling the operation of auxiliary devices in accordance with the difference in illumination of two photoelectric cells. By appropriate design of the relay circuits, the system may be employed to count objects or persons according to the direction in which the same travel to obstruct light falling upon the two cells.

The application of the invention which is shown in Fig. 4 includes a simple relay system in which the operation of the controlled device is dependent only upon a predetermined difference in illumination, and not upon the particular cell which is illuminated when the other is dark. The circuit including the cells 1, 2, the moving coil of a relay 4, and, if desired, a sensitive ammeter 3, is the same as that shown in the other views. The contact arm 7 of the relay is connected to one terminal of a source of current, such as one direct terminal of a full wave rectifier 8, and the contacts 9, 9 of the relay are joined to each other and connected through the winding 10 of a power relay to the other direct current terminal of the rectifier 8. The rectifier is supplied with alternating current by the secondary of a step-down transformer 11 that is connected across the usual house lighting circuit.

As shown diagrammatically, the normally open switches 12, 13 are closed when the solenoid 10 is energized, the switch 13 being included in a circuit which includes the power line and the operating mechanism, such as the solenoid 14, of the door opener, while the switch 12 is included in a holding circuit that is shunted across the contacts 7, 9 of the primary relay. The movable contact of a normally closed switch 15 in the holding circuit is so positioned that the door strikes the contact to break the holding circuit when the door has swung to fully open position, thus interrupting the flow of current to solenoid 10 and opening switch 13 in the circuit of the solenoid 14. The door is then reclosed by a spring 16.

A circuit, preferably including an adjustable resistance 17, is connected across the secondary of the transformer 11 to supply current to spotlights 18 that illuminate the photoelectric cells 1, 2. The cell and spotlights are placed at opposite sides of the hallway in which the door is located and the light rays may be concentrated on the cells by lenses 19 and tubes 20. Since the lamps are supplied, either in series or in parallel, from the same current source, the illumination at the photoelectric cells 1 and 2 will be approximately the same and the current outputs of the cells may be equalized by including a resistance 21 in one of the leads $a$ or $b$, and connecting the shunt circuit $c$ to an adjustable slider 22 on the resistance.

The photoelectric cells are so positioned that they are subjected to substantially equal illumination both from daylight and from any artificial lighting. When equally illuminated, the cells produce equal currents and the contact arm 7 of relay 4 stands in mid position between the contacts 9, thus opening the circuit to the power relay 10.

Unequal current flow deflects the contact arm to engage one of the contacts 9, thus energizing the relay 10 to close the switch 11 of the door opener circuit.

When the door to be opened is located in a hallway, as illustrated in Fig. 4, the cells may be located side by side and illuminated by a single spotlight, substantially as shown diagrammatically in Figs. 1 to 3; the light being so spaced from the cells that a moving object approaching the door casts a shadow upon first one and then the other of the cells. The relay contact arm 7 is thereby deflected in first one direction and then the other and, by known types of secondary relays and switches, the particular door which will be opened may be made dependent upon the direction of travel of the object.

The action of the system is not dependent upon the absolute illumination of either cell, but only upon the difference in illumination. When the light source for illuminating both cells is a single or two electric lights, the fluctuations in line voltage will not affect the system even when the intensity of the light beams varies materially. A further advantage of the system is that, when the cells are located at opposite sides of a door, a single photoelectric relay and two photoelectric cells replace the known arrangements which have employed two relays and two cells to show the direction from which the door is approached and when it is passed.

While the invention has been described in connection with door opening mechanism, it will be understood that the photoelectric relay system may be employed for other purposes, such as counting the number or indicating direction of travel of objects moving past the cells, the starting of a machine as an object or piece of work moves into the same, or the stopping of a machine as it discharges a finished article. The invention contemplates a sensitive measuring or relay system in which a current responsive device is subjected to the differential action of currents generated by two photoelectric cells and, in its broader aspects, the invention is not limited to the particular use for which the system is employed.

I claim:

1. A photoelectric cell circuit responsive to the differential illumination at two points, said circuit comprising a current-generating photoelectric cell at each of the points, circuit elements connecting unlike terminals of said cells to arrange the same in series aiding relation, a current-responsive device in a circuit shunted across said circuit elements, whereby said device responds to the difference in the current outputs of the respective cells, and an adjustable resistance for controlling the current flow established through said device by at least one of said cells.

2. A photoelectric cell circuit responsive to the differential illumination at two points, said circuit comprising a current-generating photoelectric cell at each of the points, circuit elements connecting unlike terminals of said cells to arrange the same in series aiding relation, and a current-responsive device in a shunt circuit connected across said circuit elements, whereby said device responds to the difference in the current outputs of the respective cells; one of said circuit elements being a resistance, and said shunt circuit includes a tap adjustable along said resistance.

3. In a photoelectric cell circuit, a pair of current-generating photoelectric cells each having a positive and a negative terminal, a circuit element connecting the positive terminal of one cell to the negative terminal of the other cell, a resistance connected between the other terminals of said cells, an adjustable tap on said resistance, and a circuit including a current-responsive device connected between said adjustable tap and said circuit element.

4. A photoelectric cell circuit as claimed in claim 3, in combination with a current-measuring instrument in series with said current-responsive device.

5. In apparatus of the type stated, a pair of photoelectric cells of the current generating type, leads connecting unlike terminals of the cells to complete a series circuit, a relay shunted across said leads and having a pair of contact members, whereby the current flow in said relay is equal to the difference between the currents generated by the cells, an auxiliary relay and a source of current connected to the respective contact members of said first relay, a pair of switches controlled by said auxiliary relay, operating mechanism for moving an object and a source of power for actuating said mechanism, and a circuit including the first of said relay switches for controlling the actuation of said mechanism by said power source, and a holding circuit shunting said contact members and including the other relay switch in series with a third switch, said third switch being normally closed and being positioned in the path of movement of the object to be actuated thereby when the object is moved to a predetermined distance by said mechanism.

6. Apparatus for automatically displacing an object when the latter is approached from either side, said apparatus comprising a current-generating photocell at each side of the normal position of said object, light projectors for illuminating the respective photocells by light beams which extend across the paths by which the object is approached, a motor for displacing the object out of its normal position, spring means for returning the object to its normal position, means operative when the illumination at either photocell falls substantially below that at the other photocell for energizing said motor, holding means operative when said motor is energized for retaining the same in energized condition independently of the illumination at either photocell, and means actuated by the object when the latter reaches fully displaced position for rendering said holding means inoperative, whereby said spring means returns the object to its normal position.

7. Apparatus for automatically displacing an object when the latter is approached from either side of its normal position, said apparatus comprising a motor for displacing the object, a photocell at each side of the normal position of the object, relay means responsive to a predetermined difference in the illumination at the respective photocells for closing a circuit to said motor, a holding circuit for said relay means, and means actuated by the object when moved into displaced position for opening said holding circuit.

8. Photoelectric control mechanism comprising a motor adapted to effect a predetermined displacement of an object upon each energization of the motor, an energizing circuit for said motor, means actuated by the differential illumination of photocells at opposite sides of said object for closing said energizing circuit, and means operative upon the energization of said motor to complete the predetermined displacement of the object to open said energizing circuit.

9. In a photoelectric control system, the combination with mechanism for displacing an object, and an energizing circuit for said mechanism, of a photoelectric cell of the current generating type at each side of said object, leads connecting unlike terminals of said photocells in a series circuit, a current responsive relay shunted across said leads and having a pair of cooperating contacts controlled by the difference in the current outputs of the two photocells, an auxiliary relay and a source of current connected in a series circuit between said relay contacts, said auxiliary relay including a switch for closing the energizing circuit of said mechanism, and means operative upon a predetermined energization of said mechanism and corresponding predetermined displacement of the object for opening said energizing circuit.

10. In apparatus for moving an object, the combination with mechanism for moving an object and an energizing circuit for said mechanism, of photocells at opposite sides of the object, leads connecting unlike terminals of the cells in a series circuit, a current-response relay shunted across said leads and having a pair of contacts controlled by the difference in the current outputs of the two photocells, an auxiliary relay and a source of current connected in a series circuit between said relay contacts, a pair of switches controlled by said auxiliary relay, and a holding circuit for said auxiliary relay including one of said switches, the second relay switch being included in the energizing circuit of said mechanism.

11. In a control system, the combination with a photoelectric cell circuit comprising a pair of current-generating photoelectric cells, a current-responsive device, circuit means connecting said cells and device to subject said device to opposing currents generated by the respective cells, and controlled means energized by said device when current outputs of the cells are unequal, of means for illuminating said cells; said illuminating means comprising a light individual to each cell, a source of current, and circuit elements connecting said lights in series with each other and with said source of current, whereby a failure of either light results in the extinction of the other light.

ANTHONY H. LAMB.